UNITED STATES PATENT OFFICE.

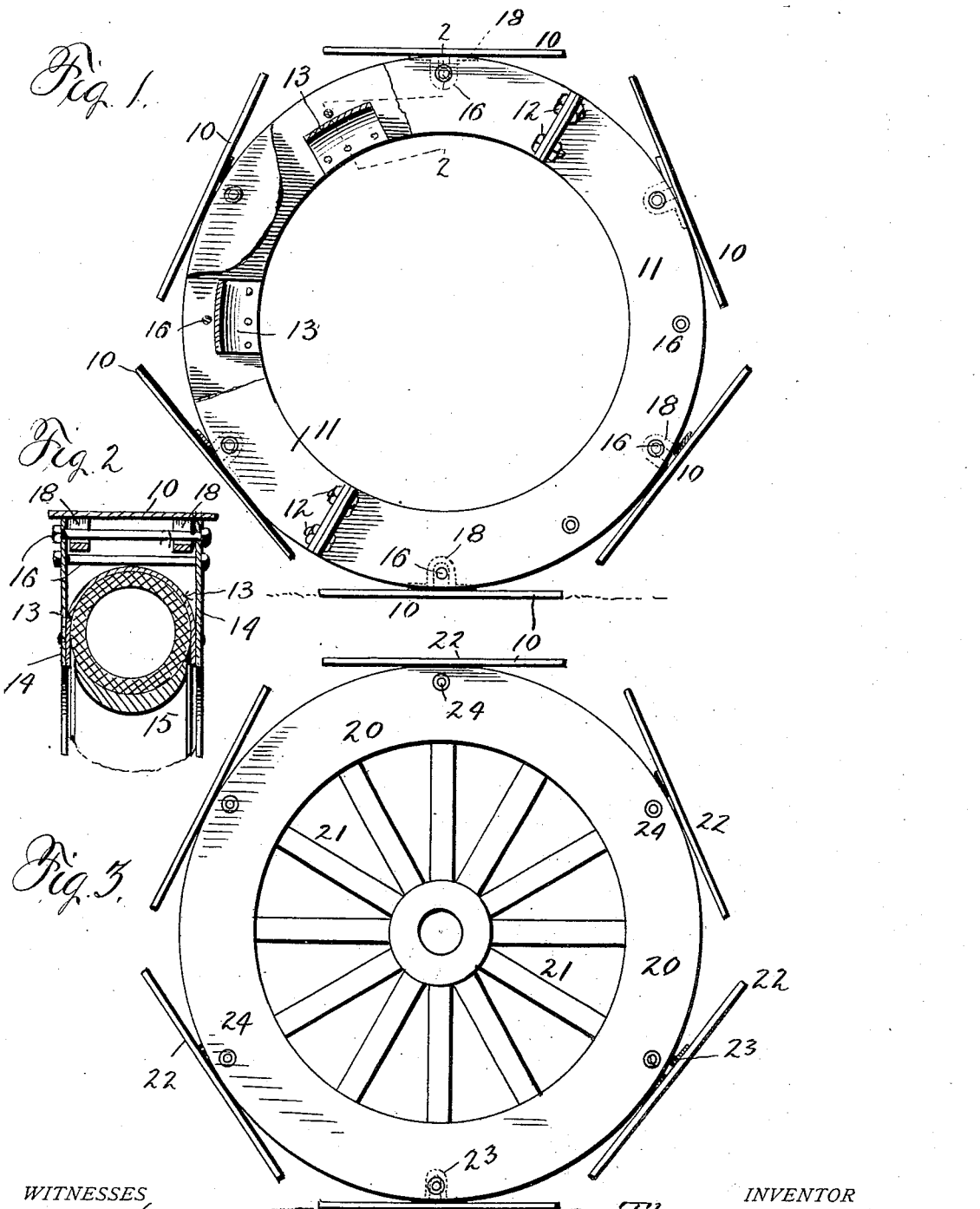

THOMAS ASBURY MILLER, OF STOCKTON, CALIFORNIA.

VEHICLE-WHEEL.

1,117,138.  Specification of Letters Patent.  Patented Nov. 10, 1914.

Application filed August 2, 1911. Serial No. 642,014.

*To all whom it may concern:*

Be it known that I, THOMAS A. MILLER, a citizen of the United States, residing at Stockton, in the county of San Joaquin and State of California, have invented certain new and useful Improvements in Vehicle-Wheels, and do hereby declare that the following is a full, clear, and exact description of the same, reference being had to the annexed drawings, making a part of this specification, and to the letters and figures of reference marked thereon.

The object of my invention is to enable wheeled vehicles to travel over ground that is so soft or miry that it is impossible or exceedingly difficult for the ordinary wheels to traverse without sinking to an objectionable extent therein, and my invention is applicable to traction engine wheels, automobile wheels and other vehicles having wheels, whether the wheels are used merely for carrying purposes or as traction wheels.

In the accompanying drawings—Figure 1 is a side elevation of an embodiment of my invention adapted for the removable attachment thereof to an automobile wheel; Fig. 2 is a cross section thereof on the line 2—2 of Fig. 1; Fig. 3 is a side elevation of a wheel constructed to embody my invention.

Generally described, my invention is embodied in a structure in which there is a circular series of broad or wide plates on the circumference or forming the circumference of a wheel and hinged thereto, so that as the wheel revolves, the plates in succession bear upon the ground and thus form a wide or extended bearing therewith that prevents the sinking of the wheel into the ground even though it may be soft or miry; and besides that advantage by reason of its wide bearing on the ground, skidding is prevented, especially if the bearing surface of the plate is roughened as by means of grooves or corrugations. The wheel may be constructed so as permanently to retain the plates, or the invention may be embodied in the form of an attachment for ordinary wheels.

In Figs. 1 and 2 of the drawings, I illustrate my invention in the form of an attachment for an automobile wheel. In this case the circumferentially extending series of plates 10 are attached to the rim sections 11 which together constitute a circle or ring, the sections being jointed at contiguous ends by means of bolts 12 that pass through lugs or projections on the respective sections. The rim may have a semicircular form in cross section adapted to fit over the wheel tire, or it may consist of a series of shoes 13 and side plates 14 riveted or otherwise secured to opposite sides of the shoe and extending preferably from the wheel felly 15 outward so that the tire is completely covered or housed. Outside the shoe 13 the side pieces 14 are connected by transverse bolts 16, and upon certain of the bolts 16 are hinged the circumferentially extending series of ground engaging plates 10. The pivotal connection of each plate with its bolt is a simple one consisting of merely two eyes 18 projecting inward from the plate 10 which form such a loose connection between the plates and the wheel rim that when a plate is beneath the rim and on the ground there will be no bearing outward of the eyes upon the pivot rod or bolt, but the entire bearing will be formed by the contact of the rim of the wheel with the upper side of the plate, the result being that the movement of the wheel is a smooth one free from any bumps or jars, such as would take place were there an actual bearing downward of the wheel upon the pivot bolts.

As will be seen from the drawings, the bolt or pivot pin 16 is less in diameter than the distance between the front and back walls of the eyes 18, so that limited movement of the bolt or pin horizontally as well as vertically, can take place before the front and back walls of the eyes are struck.

In Fig. 3 I show my invention embodied in a wheel in which the tire or rim is formed of a pair of plates 20 attached to spokes 21 in a permanent relation, and the ground engaging plates 22 are hung by eyes 23 on transverse bolts 24 passing between the rims, there being the same loose connection between the plates 22 and wheel rim as has already been described, whereby in the revolution of the wheel, the rim of the wheel bears directly upon and receives its support from the plates 22.

The plates or tracks may be formed of any desired material, both metal and wood being available, and their ground engaging surfaces may be plain or roughened as by corrugations or grooves or otherwise in order to provide a non-slipping bearing surface.

Having thus described my invention what I claim is—

1. A device of the character described comprising side plates, arcuate shoes connecting said side plates, bolts connecting said side plates outside said shoes, ground engaging plates, and elongated eyes extending from said ground engaging plates between said side plates, said bolts extending through said eyes to slidably and pivotally mount said ground engaging plates.

2. A device of the character described comprising side plates, bolts connecting said side plates, ground engaging plates, and elongated eyes extending from said ground engaging plates between said side plates, said bolts extending through said eyes to slidably and pivotally mount said ground engaging plates and said side plates protecting said eyes.

3. A device of the character described comprising side plates, each comprising arcuate sections removably connected, ground engaging plates provided with elongated eyes extending between said side plates, and securing bolts for said side plates extending between the same and through said eyes to slidably and pivotally mount said ground engaging plates.

In testimony whereof I affix my signature in presence of two witnesses.

THOMAS ASBURY MILLER.

Witnesses:
ARTHUR B. MILLER,
O. H. CRAIG.

---

Copies of this patent may be obtained for five cents each, by addressing the "Commissioner of Patents, Washington, D. C."